United States Patent
Lopez et al.

(10) Patent No.: US 12,362,774 B2
(45) Date of Patent: Jul. 15, 2025

(54) COMMUNICATION NODE AND METHOD FOR GENERATING MODULATED SIGNALS BY BACKSCATTERING

(71) Applicant: Telefonaktiebolaget LM Ericsson (publ), Stockholm (SE)

(72) Inventors: Miguel Lopez, Solna (SE); Leif Wilhelmsson, Lund (SE); Henrik Sjöland, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 418 days.

(21) Appl. No.: 17/926,020

(22) PCT Filed: May 18, 2020

(86) PCT No.: PCT/EP2020/063771
§ 371 (c)(1),
(2) Date: Nov. 17, 2022

(87) PCT Pub. No.: WO2021/233514
PCT Pub. Date: Nov. 25, 2021

(65) Prior Publication Data
US 2023/0179239 A1  Jun. 8, 2023

(51) Int. Cl.
*H04B 1/04* (2006.01)
*H04L 27/36* (2006.01)

(52) U.S. Cl.
CPC .......... *H04B 1/0475* (2013.01); *H04L 27/36* (2013.01)

(58) Field of Classification Search
CPC .......... H04B 1/0475; H04B 5/45; H04B 5/20; H04L 27/36; G01S 13/758
(Continued)

(56) References Cited

U.S. PATENT DOCUMENTS

2008/0225932 A1  9/2008  Fukuda
2015/0048966 A1* 2/2015  Manku .............. G01S 13/74
                                                342/51
(Continued)

FOREIGN PATENT DOCUMENTS

EP    1 596 320 A2    11/2005
WO    2018/075653 A1  4/2018
WO    2019/052626 A1  3/2019

OTHER PUBLICATIONS

International Search Report and Written Opinion dated Jan. 29, 2021 in International Application No. PCT/EP2020/063771 (10 pages).
(Continued)

*Primary Examiner* — Don N Vo
(74) *Attorney, Agent, or Firm* — Rothwell, Figg, Ernst & Manbeck, P.C.

(57) ABSTRACT

A wireless communication node (500) and method therein for generating and transmitting a modulated radio frequency (RF) signal by means of backscattering are disclosed. The wireless communication node (500) comprises an antenna (510) configured to receive a illuminating RF signal, a switch (520) that has M states, a set of impedances (530) comprising Mimpedances (Z1, Z2 . . . ZM). The antenna (510) is coupled to the set of impedances (530) by the switch (520). The wireless communication node (500) further comprises a modulating value generator (540) configured to generate modulating values based on data to be transmitted and a frequency offset and a switch controller (550) configured to switch the state of the switch (520) based on the generated modulating values such that the antenna (510) is connected to a selected impedance among the M impedances. The received illuminating RF signal at the antenna (510) is modulated by the generated modulating values and reflected by the antenna (510) to generate and transmit the
(Continued)

modulated RF signal. The switching rate is an integer multiple of the data rate, the integer is greater than 1 and the center frequency of the modulated RF signal has the frequency offset with respect to the center frequency of the received illuminating RF signal.

14 Claims, 5 Drawing Sheets

(58) Field of Classification Search
 USPC .................................................. 455/114.2
 See application file for complete search history.

(56) References Cited

U.S. PATENT DOCUMENTS

| | | | |
|---|---|---|---|
| 2015/0091700 A1* | 4/2015 | Ovard | G06K 7/0008 340/10.1 |
| 2016/0164548 A1* | 6/2016 | Deyle | H04B 7/26 455/41.2 |
| 2016/0365890 A1 | 12/2016 | Reynolds et al. | |
| 2017/0371026 A1* | 12/2017 | Charvat | H01Q 9/0428 |
| 2019/0212428 A1* | 7/2019 | Santra | G01S 7/4865 |

OTHER PUBLICATIONS

International Preliminary Report on Patentability and Written Opinion dated Nov. 17, 2022 in International Application No. PCT/EP2020/063771 (8 pages).

Kimionis, J. et al., "Enhancement of RF Tag Backscatter Efficiency With Low-Power Reflection Amplifiers", IEEE Transactions On Microwave Theory and Techniques, vol. 62, No. 12, Dec. 2014 (10 pages).

Ensworth, J. F. et al., "Every Smart Phone is a Backscatter Reader: Modulated Backscatter Compatibility with Bluetooth 4.0 Low Energy (BLE) Devices", 2015 IEEE International Conference on RFID (RFID) (8 pages).

Kellogg, B. et al., "Passive Wi-Fi: Bringing Low Power to Wi-Fi Transmissions," in the Proceedings of the 13th USENIX Symposium on Networked Systems Design and Implementation (NSDI '16), Mar. 16-18, 2016, Santa Clara, CA, USA (15 pages).

Thomas, S. J. et al., "Quadrature Amplitude Modulated Backscatter in Passive and Semipassive UHF RFID Systems", IEEE Transactions On Microwave Theory and Techniques, vol. 60, No. 4, Apr. 2012 (8 pages).

* cited by examiner

COMMUNICATION NODE AND METHOD FOR GENERATING MODULATED SIGNALS BY BACKSCATTERING

CROSS REFERENCE TO RELATED APPLICATIONS

This application is a 35 U.S.C. § 371 National Stage of International Patent Application No. PCT/EP2020/063771, filed May 18, 2020.

TECHNICAL FIELD

Embodiments herein relate to a wireless communication node and method therein for generating modulated signals. In particular, the embodiments relate to generation of modulated signals in a passive or semi-passive device by backscattering.

BACKGROUND

Semi-passive and passive transmitters have been used in various applications. Passive transmitters are powered entirely by the energy received from an incoming RF signal. Semi-passive transmitters have a battery and consume power to perform baseband processing, but lack a power amplifier and many other components present in a typical radio frequency (RF) transmitter signal chain. Thus, both passive and semi-passive transmitters are power efficient.

The main idea with the semi-passive and passive transmitters is to delegate the generation of RF carriers to an external node that is mains powered. This implies that no power-hungry RF power amplifiers, oscillators, or mixers are needed in the semi- or passive device. The semi- or passive devices generate transmitting signals by using an antenna mismatched to the incoming RF carrier signal, thus reflecting or backscattering the incoming radio waves, and by modulating the reflected electromagnetic waves in order to transmit data to a receiving unit.

The passive and semi-passive devices have good potential in Internet of Things (IoT) applications, due to their low power consumption. For examples, in Kellog et al, "Passive WiFi: Bringing Low Power to Wi-Fi Transmissions", University of Washington, it is shown how to implement a power efficient semi-passive device compliant with the IEEE 802.11b standard. In Ensworth J. F., Reynolds M. S., "Every smart phone is a backscatter reader: Modulated backscatter compatibility with Bluetooth 4.0 Low Energy (BLE) devices", Radio Frequency Identification (RFID), 2015 IEEE International Conference, 15-17 Apr. 2015, it is shown how to modify passive RFID tags so that the reflected signal can be received by ordinary off-the-shelf Bluetooth Low Energy (BLE) receivers.

A problem with passive and semi-passive generation of RF carrier signals by means of backscattering is that the power of the backscattered waves is usually quite small in comparison with the power of the carrier signal transmitted by the RF generator. Thus, the RF generator generates interference at the receiving unit.

One way to solve this problem is to design backscattered waveforms that are tolerant to unmodulated carrier interference, e.g. by applying some line codes at the backscattering IoT device, and to have receivers with large enough dynamic range that can block or attenuate the carrier signal, and also receive and decode the backscattered signal. A problem with this solution is that the RF generator may cause interference to other wireless devices in the neighborhood, e.g. Wi-Fi, Bluetooth Low Energy (BLE) or other devices. It also requires sophisticated receivers.

Another way to solve this problem is to shift the backscattered signal in frequency so that the receiver can more easily filter out the interference from the RF generator. This solution also makes it easier to control interference to other devices. For example, the RF generator transmits in the guard band of Wi-Fi channels thus alleviating the problem of interference to nearby Wi-Fi devices. Shifting in frequency is utilized in the two examples of the IoT applications described above, wherein the modulation of the backscattered signal creates two modulated signals, one has a center frequency located at the left side of the center frequency of the illuminating RF carrier, and one has a center frequency located at the right side of the center frequency of the illuminating RF carrier. FIG. 1 illustrates the frequency spectrums of the backscattered signals when a frequency shift by $\Delta f$ is imparted by a backscattering modulator. In practice this means that half of the backscattered power is wasted since only one of the modulated signals is received by the receiver, and some interference is also generated.

SUMMARY

It is therefore an object of embodiments herein to provide an improved method and apparatus for generation of modulated signals by means of backscattering in a wireless communication network.

According to a first aspect of embodiments herein, the object is achieved by a wireless communication node for generating and transmitting a modulated RF signal by means of backscattering. The wireless communication node comprises an antenna configured to receive an illuminating RF signal, a switch that has M states, a set of impedances comprising M impedances. The antenna is coupled to the set of impedances by the switch. The wireless communication node further comprises a modulating value generator configured to generate modulating values based on data to be transmitted and a frequency offset and a switch controller configured to switch the state of the switch based on the generated modulating values such that the antenna is connected to a selected impedance among the M impedances. The received illuminating RF signal at the antenna is thus modulated by the generated modulating values and reflected by the antenna to generate and transmit the modulated RF signal. The switching rate is an integer multiple of the data rate, the integer is greater than 1 and the center frequency of the modulated RF signal has the frequency offset with respect to the center frequency of the received illuminating RF signal.

According to a second aspect of embodiments herein, the object is achieved by a method performed in wireless communication node for generating and transmitting a modulated RF signal by means of backscattering. The wireless communication node receives an illuminating RF signal by an antenna and generates modulating values based on data to be transmitted and a frequency offset by a modulating value generator. The wireless communication node modulates the received illuminating RF signal by switching the state of a switch by a switch controller based on the generated modulating values such that the antenna is connected to a selected impedance among a set of impedances. The switching rate is an integer multiple of the data rate, the integer is greater than 1 and the center frequency of the modulated RF signal has the frequency offset with respect to the center frequency of the received illuminating RF signal.

The wireless communication node transmits the modulated RF signal by reflecting the modulated RF signal at the antenna.

Embodiments herein provide an efficient method to generate and transmit a modulated RF signal without creating two spectral images. The modulation method may be implemented in a backscattering device by switching antenna loads.

Embodiments herein provide generation of phase modulated as well as OOK modulated backscattered waveforms. In the case of OOK it is possible to create a spectral image with the inverse modulation, to maximize the total backscattered energy.

By generating a modulated RF signal with only one spectral image, the useful reflected power is increased by 3 dB when compared to prior art. Moreover, the switch state may be generated by means of table lookups, which require very little computation and may be implemented very efficiently in low cost backscattering devices.

Therefore, the embodiments herein provide an improved method and apparatus for generation and transmission modulated RF signals in a wireless communication network.

BRIEF DESCRIPTION OF THE DRAWINGS

Examples of embodiments herein are described in more detail with reference to attached drawings in which.

DETAILED DESCRIPTION

Figure 1:
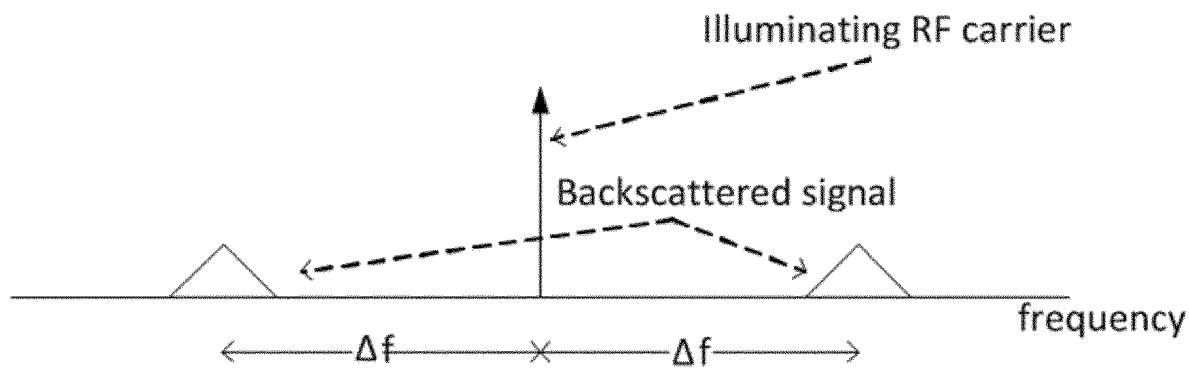
FIG. 1 is a diagram illustrating spectrum of a backscattered signal according to prior art.
Figure 2:
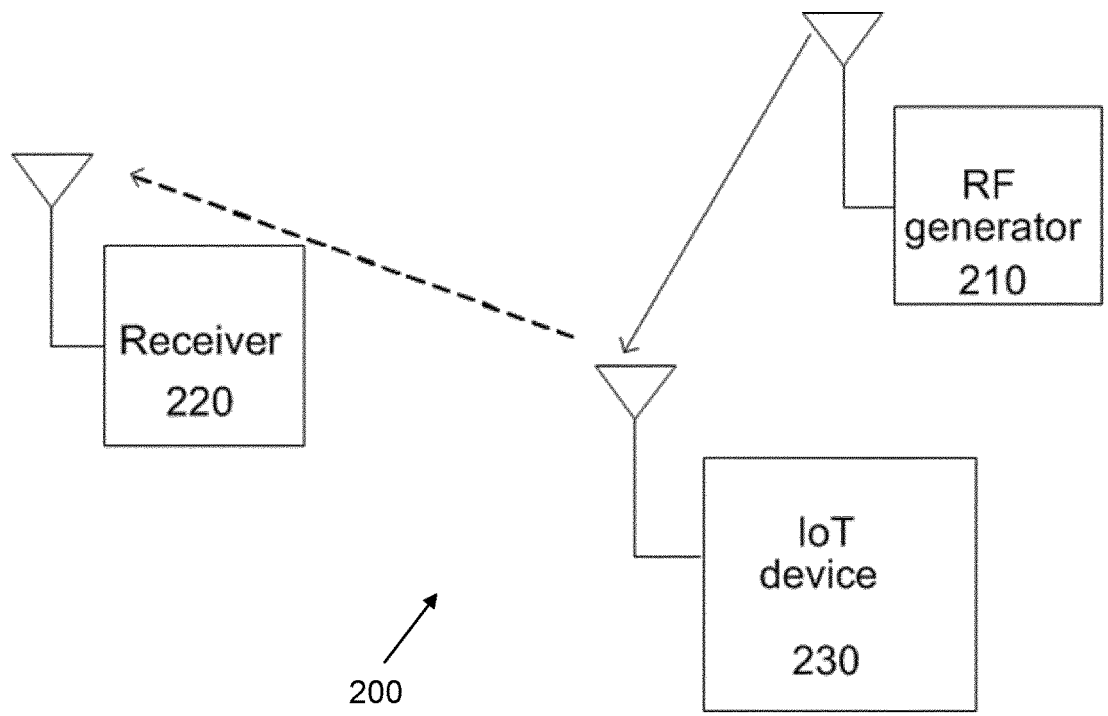
FIG. 2 is a schematic block diagram illustrating embodiments of a wireless communication network in which embodiments herein may be implemented.

FIG. 2 depicts an example of a wireless communication network 200 in which embodiments herein may be implemented. The wireless communication network 200 may be any wireless system or cellular network, such as a Long Term Evolution (LTE) network, any $3^{rd}$ Generation Partnership Project (3GPP) cellular network, Worldwide interoperability for Microwave Access (WiMax) network, Wireless Local Area Network (WLAN/Wi-Fi), an LTE advanced or Fourth Generation (4G) network, a Fifth Generation (5G) or New Radio (NR) network or Bluetooth/Bluetooth Low Energy (BLE) network etc.

The wireless communication network 200 comprises different types of wireless communication nodes, such as an RF generator 210, a receiver 220, a semi-passive or passive IoT device 230. The semi-passive or passive IoT device 230 receives an RF carrier signal from the RF generator 210 which is an external node that typically is not low power, but e.g. may be mains powered or have a large battery capacity. The RF generator 210 may be any device transmitting an RF signal at high enough power level and suitable frequency to be used for RF reflection by the semi-passive device IoT 230. The IoT device 230 generates transmitting signals by using an antenna mismatched to the incoming RF carrier signal, thus reflecting or backscattering the incoming radio waves and by modulating the reflected electromagnetic waves in order to transmit data to a receiving unit, e.g. the receiver 220. The dashed line indicates backscattered radio waves.

As part of developing embodiments herein, a semi-passive device related to prior art and principle of RF carrier generation by backscattering will first be described.

Figure 3:
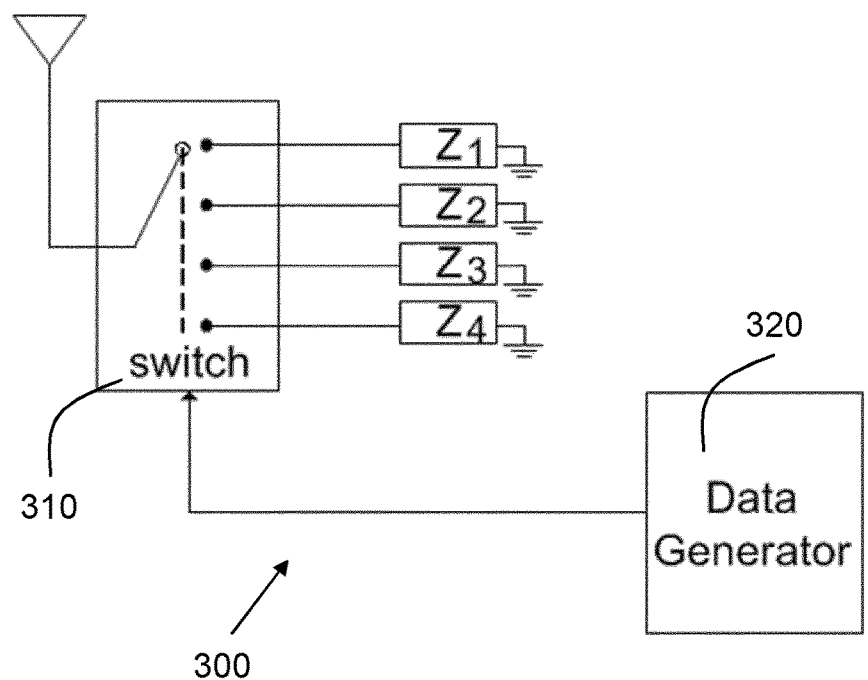
FIG. 3 is a schematic block diagram showing basic transmitter architecture of a semi-passive device.

FIG. 3 shows a basic transmitter architecture of a semi-passive device 300. The semi-passive device 300 comprises 4 antenna impedances, labeled Z1 to Z4, and one switch 310. Each impedance imparts a different phase shift to the reflected signal. By tuning these impedances it is possible to obtain any desired phase shifts, for example from a 4 Phase Shift Keying (PSK) constellation labeled 4PSK=$\{0, \pi/2, \pi, 3\pi/2\}$. Table 1 illustrates an example of relation between antenna impedance and phase shifts.

TABLE 1

| Antenna impedance | Phase shift imparted on reflected wave [rads] |
|---|---|
| $Z_1$ | 0 |
| $Z_2$ | $\pi/2$ |
| $Z_3$ | $\pi$ |
| $Z_4$ | $3\pi/2$ |

The switch 310 has 4 states, corresponding to the 4 impedances. A data generator 320 generates control signal to the switch 310 based on data to be transmitted. Thus, by modulating the state of the switch, 4-PSK can be employed to transmit data, simply by changing the state of the switch at the baud rate. In general M impedances can be used to generate M constellation symbols.

In summary, given a data symbol $\varphi_k \in 4PSK$, a switch chooses an antenna impedance Zi such that an incoming RF carrier signal, $\cos(2\pi f_c t)$ with frequency $f_c$, results in a reflected radio wave $\cos(2\pi f_c t + \varphi_k)$.

This idea can be modified or extended, and more general modulations including M-ary Quadrature Amplitude Modulation (M-QAM), 16QAM, 8PSK can be generated by backscattering. A simpler transmitter with a two-state switch and two impedances is enough to generate Binary PSK (BPSK) or On-Off Keying (OOK).

Figure 4:
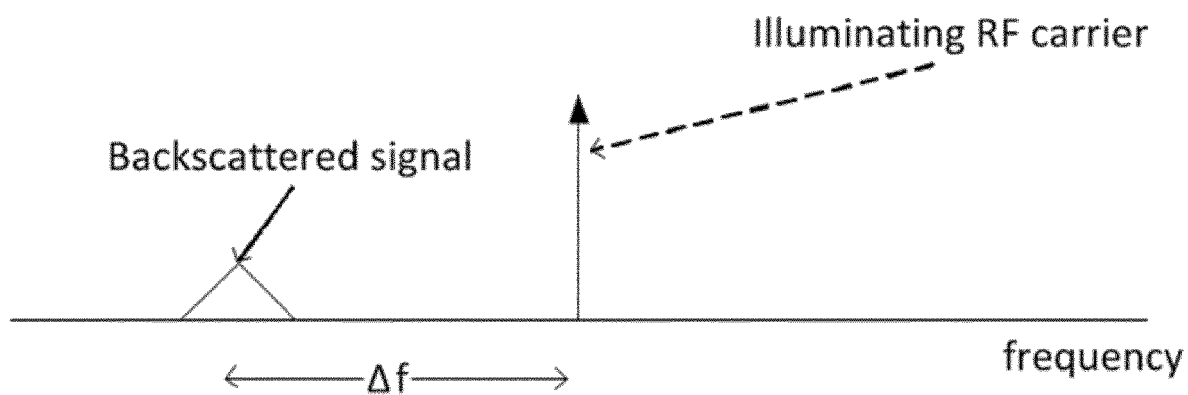
FIG. 4 is a diagram illustrating spectrum of a backscattered signal according to embodiments herein.

The embodiments herein disclose an efficient modulation method to generate a modulated RF signal by means of backscattering, while at the same time imparting a frequency shift by $\Delta f$ to the backscattered signal and whose spectrum has just one main lobe, as shown in FIG. 4. The backscattered modulated RF signal is shifted by $\Delta f$ with respect to the illuminating RF carrier frequency, and only one main lobe is created.

The modulation method can be implemented in a wireless communication node, i.e. a backscattering device, such as the semi-passive or passive IoT device 230 and the semi-passive device 300 by switching antenna loads as shown in FIG. 3.

Figure 5:
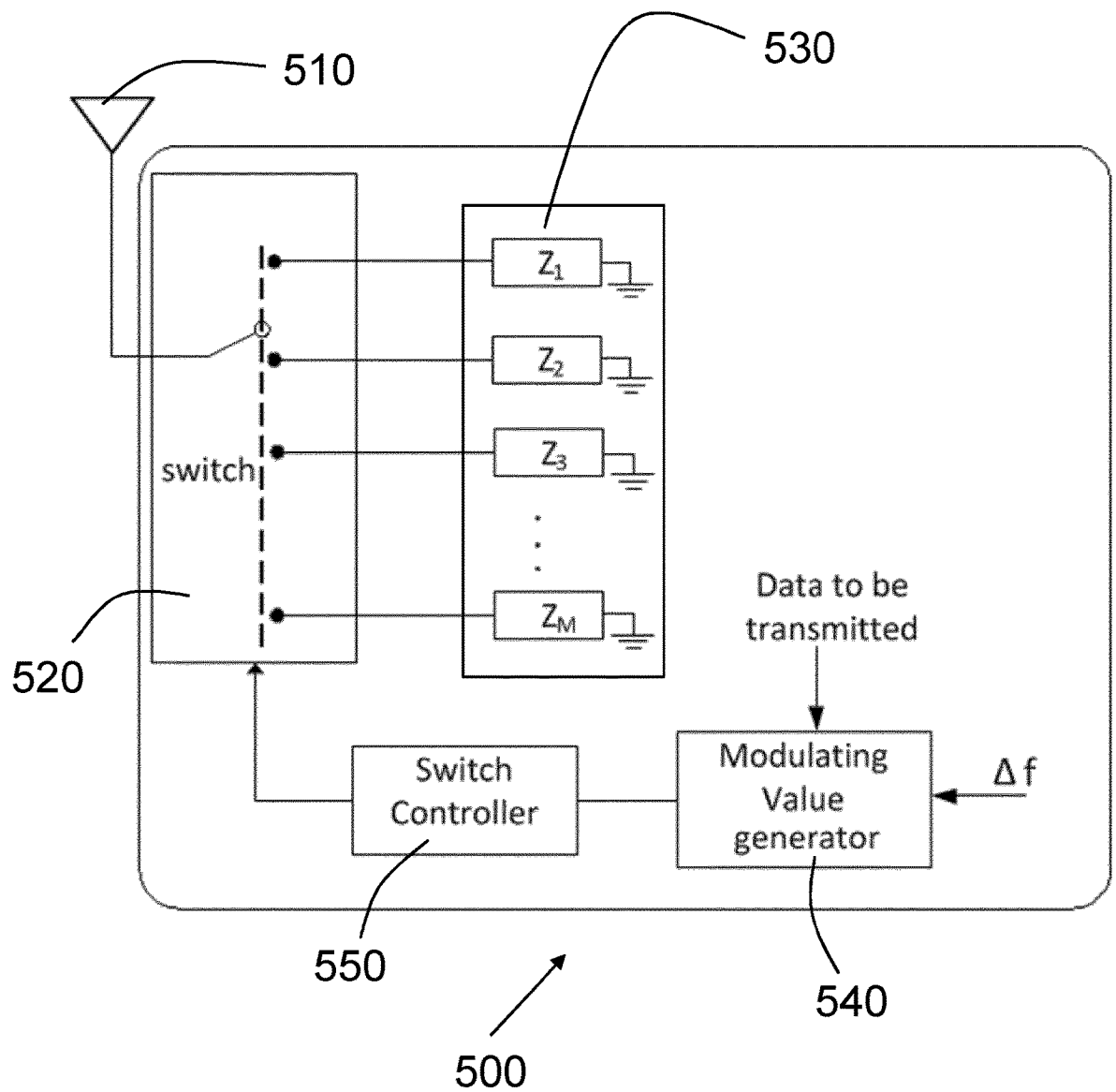
FIG. 5 is a schematic block diagram showing a wireless communication node according to embodiments herein.

FIG. 5 shows a wireless communication node 500 for generating and transmitting a modulated RF signal by means of backscattering in a wireless communication system 200. The wireless communication node 500 comprises an antenna 510 configured to receive an illuminating radio frequency (RF) signal.

The wireless communication node 500 further comprises a switch 520 that has M states.

The wireless communication node 500 further comprises a set of impedances 530 comprising M impedances Z1, Z2 . . . , ZM. The antenna 510 is coupled to the set of impedances 530 by the switch 520.

The wireless communication node 500 further comprises a modulating value generator 540 configured to generate modulating values based on data to be transmitted and a frequency offset $\Delta f$. The frequency offset $\Delta f$ may be pre-defined for a specific data packet transmission. The center frequency may be changed between different data packets and the frequency offset $\Delta f$ may be changeable as well.

The wireless communication node 500 further comprises a switch controller 550 configured to switch the state of the switch 520 based on the generated modulating values such that the antenna 510 is connected to a selected impedance among the set of impedances 530.

The switching rate is an integer multiple of the rate of the data to be transmitted, the integer is greater than 1. The received illuminating RF signal at the antenna 510 is modulated by the generated modulating values and reflected by the antenna 510 to generate and transmit the modulated RF signal. The center frequency of the modulated RF signal has the frequency offset $\Delta f$ with respect to the center frequency of the received illuminating RF signal.

According to some embodiments herein, the modulating values are phase modulating values. The goal is to generate the modulating values which modulates the phase of the RF carrier signal for a given sequence of data $\{a_k\} \in \pm 1$ to be transmitted and introduces a frequency offset $\Delta f$ with respect to the center frequency fc of the illuminating RF carrier signal. The desired modulated RF signal r(t) can be written as follows.

$$r(t)=\cos(2\pi f_c t+\varphi(t)+2\pi\Delta f t)$$

Suppose that the phase $\varphi(t)$ depends on the data sequence $\{\alpha_k\}$, a data duration T, a modulation index it, a memory L of the modulation and a phase pulse q(t). The phase pulse satisfies the constraints q(t)=0 if t<0 and q(t)=0.5 if t>L·T, for positive integer L. Specifically, $$\varphi(t) = 2\pi h \sum_{k \leq n} a_k q(t - kT), nT \leq t \leq (n + 1)T$$

Note that the phase $\varphi(t)$ can be written as $$\varphi(t) = \theta_n + 2\pi h \sum_{k=n-L+1}^{n} a_k q(t - kT), nT \leq t \leq (n + 1)T$$

where $\theta_n = \pi h \Sigma_{k \leq n-L} \alpha_k$. It is supposed that the modulation index is rational of the form h=m/p where m and p are relatively prime. It can be verified that $\theta_n$ can take only a finite number of values $\rho$. Indeed, $\rho$ is equal to p if p is odd and is equal to 2p if p is even.

According to embodiments herein, it is proposed to choose the frequency offset $\Delta f$ to be dependent of the data symbol duration T. In one embodiment, the frequency offset $\beta f$ may be an integer multiple of the reciprocal of the data symbol duration T. In other words, $\beta f=N/T$, where N is positive or negative integer. Applying the change of the time variable, s=t−nT, 0≤s≤T, to the previous equation, it follows that $$\varphi(t) + 2\pi\Delta ft(\text{mod} 2\pi) = \theta_n + 2\pi h\sum_{k=0}^{L-1} a_k q(s + kT) + 2\pi\Delta f(s + nT)(\text{mod} 2\pi),$$

$$0 \leq s \leq T$$

Note that due to the choice of the frequency offset $$2\pi\Delta f(s+nT)(\text{mod } 2\pi)=2\pi(s \, M/T+nM)(\text{mod } 2\pi)=2\pi\Delta fs \\ (\text{mod } 2\pi).$$

In summary, the phase plus frequency offset can be written as:

$$\varphi(t)+2\pi\Delta f \, t(\text{mod } 2\pi)=\theta_n+\Delta\varphi(s,a_{n-L+1}, \ldots, \alpha_n)+ \\ 2\pi\Delta f \, s(\text{mod } 2\pi), 0 \leq s \leq T,$$

Where $\Delta\varphi(s, \alpha_{n-L+1}, \ldots, \alpha_n)=2\pi h\Sigma_{k=0}^{L-1}\alpha_k q(s+kT)$.

Hence, since $\theta_n$ can take p different values and there are only $2^L$ different combinations of the data symbols $\alpha_{n-L+1}, \ldots, \alpha_n$, it follows that there are only $\rho 2^L$ different phase trajectories:

$$\theta_n+\Delta\varphi(s,\alpha_{n-L+1}, \ldots,\alpha_n)+2\pi\Delta fs(\text{mod } 2\pi), 0\leq s\leq T.$$

and they may be labelled as:

$$\{\tau_m(s): m=1, \ldots, \rho 2^L; 0 \leq s \leq T\}.$$

That is, for each m between 1 and $\rho 2^L$ there is a unique combination of values of $\theta_n$ and $\alpha_{n-L+1}, \ldots, \alpha_n$ such that $T_m(s)=O_n+\Delta\varphi(s, \alpha_{n-L+1}, \ldots, \alpha_n)+2\pi\Delta fs$ (mod $2\pi$), 0≤s≤T.

In one embodiment, time is quantized into intervals of duration T/K, where K is a positive integer. Then, a table may be constructed by quantizing the phase trajectories $\tau_m(s)$ so that at each time interval $t_n$=nT/K the phase $\tau_m(t_n)$ is chosen from a finite set of phase values that correspond to one of phase shifts that can be produced by choosing a particular antenna load, and connecting the antenna by the switch to that load to modulate the incoming RF carrier signal and backscatter the modulated RF carrier signal.

For example, suppose that there is a number M of loads that can generate M phase shifts $$\left\{0, \frac{2\pi}{M}, \frac{2 \cdot 2\pi}{M}, \ldots, \frac{(M-1) \cdot 2\pi}{M}\right\}$$

uniformly spaced over the interval from 0 to $2\pi$. Then the phase $\phi(m, n)$ is computed to be the phase in the set $$\left\{0, \frac{2\pi}{M}, \frac{2 \cdot 2\pi}{M}, \ldots, \frac{(M-1) \cdot 2\pi}{M}\right\}$$

that is closest in Euclidean distance to $\tau_m(t_n)$. In this way, a look-up table of phase values $\phi(m, n)$ comprising $\rho 2^L$ rows and K columns is pre-computed. The m-th row of the table contains K phases $\phi(m, n)$ and corresponds to a quantization $$\tau_m(0), \tau_m\left(\frac{T}{K}\right), \ldots, \tau_m\left(\frac{(K-1)T}{K}\right)$$

of the continuous time phase trajectory $\tau_m(s)$, 0≤s≤T.

The consecutive states of the switch, i.e. the particular impedances connected to the antenna, during the time period during which a given data bit is transmitted may be read from a row in the look-up table and the choice of said row is computed as a function of the given data bit and at least one or more previously transmitted data bits, often all the previously transmitted bits. So the row in the look-up table is a sequence of precomputed modulating values to indicate which impedance the antenna should be switched to.

For example, suppose to transmit data bits b(0),b(1), b(2), . . . etc, T is data symbol duration and in this is case is the data bit duration when there is a single bit per symbol, the switch changes position K times during this time period. To transmit the nth data bit, the look-up table gives K values that correspond to the position of the switch at times t(i)=nT+i*T/K, for 0<=i<K Therefore these K values indicate how to switch the switch. They are determined by the data bits b(0), b(1), . . . , b(n). The number of rows in the look-up table depends on the modulation index and the memory L of the modulation, i.e. $\rho 2^L$ As an illustration consider the quantization of a Minimum Shift Keying (MSK), which is characterized by parameters h=1/2, L=1. Suppose that the backscattering device comprises 8 loads that can generate 8-PSK signals, i.e. phase shifts $$\left\{0, \frac{2\pi}{8}, \frac{2 \cdot 2\pi}{8}, \ldots, \frac{7 \cdot 2\pi}{8}\right\}.$$

Further, suppose that $$T = 1 \text{ μs}, \Delta f = \frac{2}{T} = 2 \text{ MHz},$$

and each time interval of duration T is quantized into K=8 sub-intervals. Then the switching frequency at the backscattering device is 8 MHz, ρ=4, and the look-up table has dimensions 8×8 and is illustrated in Table 2.

The entries in the look-up table point to a load number m that results in a backscattered wave with a phase shift by (m−1)π/8. The data stream determines the row to be used during each time interval of duration T. The position of the switch during this time interval of duration T is toggled 8 times, connecting successively the impedance indicated by the selected row and column to the backscatter antenna. In this way, the illuminating RF carrier is modulated and reflected, and an MSK signal with 2 MHz higher carrier frequency than the RF carrier is generated and transmitted.

TABLE 2

|  | $t_0$ | $t_1$ | $t_2$ | $t_3$ | $t_4$ | $t_5$ | $t_6$ | $t_7$ |
|---|---|---|---|---|---|---|---|---|
| $\theta_n = 0, a_n = 1$ | 3 | 5 | 7 | 2 | 4 | 6 | 1 | 3 |
| $\theta_n = 0, a_n = -1$ | 3 | 5 | 7 | 8 | 2 | 4 | 5 | 7 |
| $\theta_n = \frac{\pi}{2}, a_n = 1$ | 5 | 7 | 2 | 4 | 6 | 8 | 3 | 5 |
| $\theta_n = \frac{\pi}{2}, a_n = -1$ | 5 | 7 | 1 | 2 | 4 | 6 | 8 | 1 |
| $\theta_n = \pi, a_n = 1$ | 7 | 1 | 4 | 6 | 8 | 2 | 5 | 7 |
| $\theta_n = \pi, a_n = -1$ | 7 | 1 | 2 | 4 | 6 | 8 | 2 | 3 |

TABLE 2-continued

|  | $t_0$ | $t_1$ | $t_2$ | $t_3$ | $t_4$ | $t_5$ | $t_6$ | $t_7$ |
|---|---|---|---|---|---|---|---|---|
| $\theta_n = \frac{3\pi}{2}, a_n = 1$ | 5 | 7 | 2 | 4 | 6 | 8 | 3 | 5 |
| $\theta_n = \frac{3\pi}{2}, a_n = -1$ | 5 | 7 | 8 | 2 | 4 | 6 | 8 | 1 |

Figure 6:
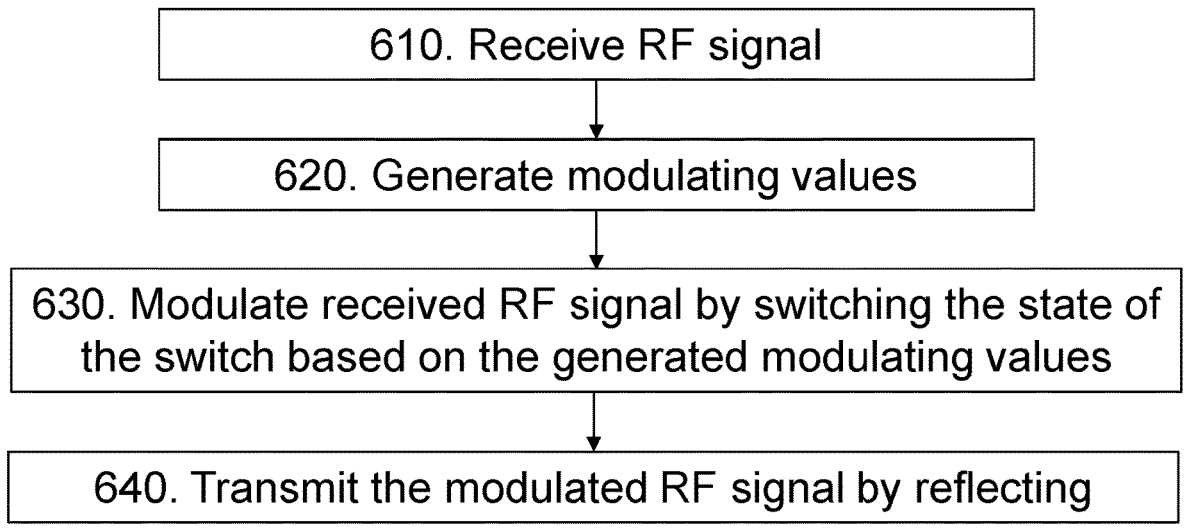
FIG. 6 is a flowchart depicting one embodiment of a method in a wireless communication node.

A method for generating and transmitting a modulated RF signal by means of backscattering in a wireless communication node 230, 330, 500 in a wireless communication system 200 will be described with reference to FIG. 6. The method comprises the following actions.

Action 610

The wireless communication node 230, 330, 500 receives an illuminating radio frequency (RF) signal with a center frequency of fc by an antenna 510 comprised in the wireless communication node 230,330, 500.

Action 620 The wireless communication node 230, 330, 500 generates by a modulating value generator 540 modulating values based on data to be transmitted and a frequency offset Δf.

The modulating values may be generated by quantizing a phase value that is calculated based on the data to be transmitted, modulation index, phase pulse with memory and frequency offset Δf, and stored in a look-up table as described above. The look-up table comprises consecutive states of the switch, i.e. the particular impedances connected to the antenna, during a time period during which a given data bit is transmitted.

The switch controller 550 may control the state of the switch by reading the modulating values from the look-up table.

Action 630

The wireless communication node 230, 330, 500 modulating the received illuminating RF signal by switching the state of the switch 520 by the switch controller 550 based on the generated modulating values such that the antenna 510 is connected to a selected impedance among the M impedances. The switching rate is an integer multiple of the data rate and the integer is greater than 1. In this way the received illuminating RF signal at the antenna 510 is modulated by the generated modulating values and the modulated RF signal is generated.

Action 640

The wireless communication node 230, 330, 500 reflects by the antenna 510 the generated modulated RF signal to transmit the modulated RF signal.

Figure 7:
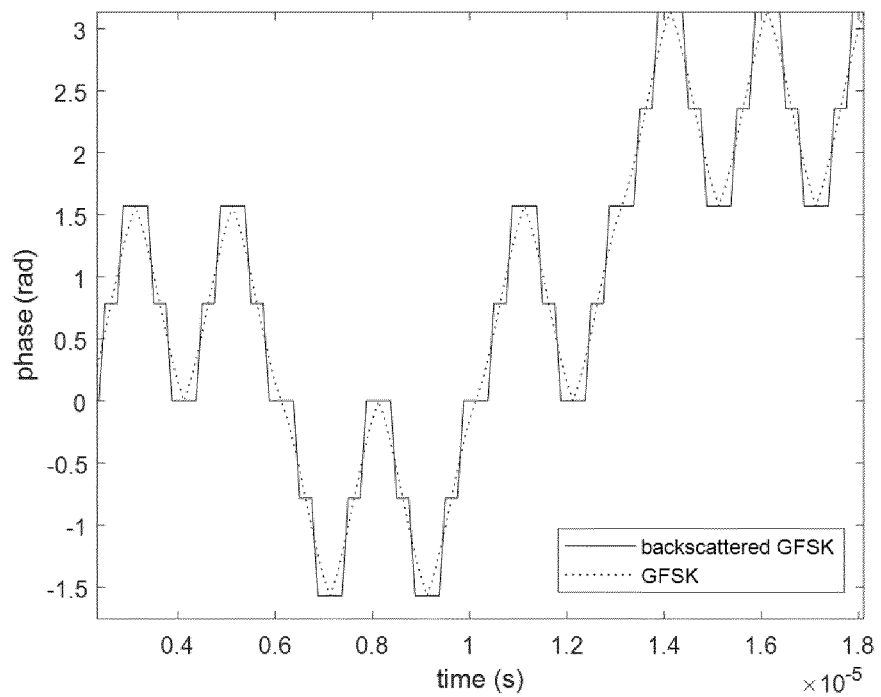
FIG. 7 is a diagram illustrating quantized phase of a backscattered GFSK signal according to embodiments herein, compared to the phase of an ideal GFSK signal.
Figure 8:
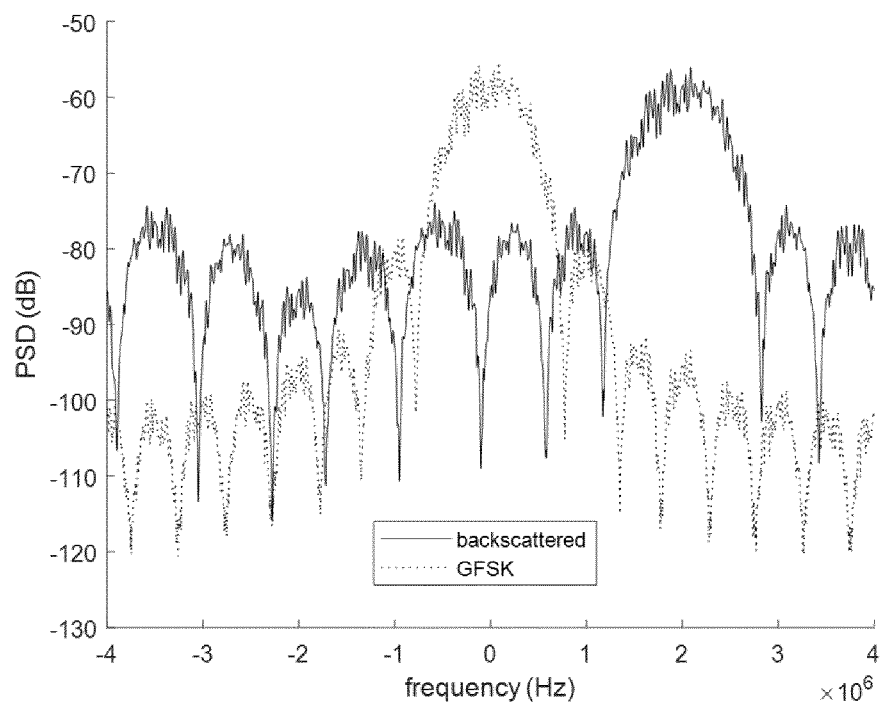
FIG. 8 is a diagram illustrating spectrum of a backscattered GFSK signal according to embodiments herein.

According to embodiments herein, the modulated RF signal may be a Frequency Shift Keying (FSK) modulated signal, e.g. a Gaussian FSK(GFSK) modulated signal. FIG. 7 is a diagram illustrating a quantized phase of a backscattered GFSK signal generated according to embodiments herein, compared to the phase of an ideal GFSK signal. FIG. 8 is a diagram illustrating spectrum of a backscattered GFSK signal, shifted by 2 MHz. As a comparison, the spectrum of an ideal GFSK signal is also shown. It can be seen that the spectrum of the backscattered signal consists of only one main lobe with a center of frequency at 2 MHz. The frequency of 0 MHz in the graph corresponds to the center frequency of the illuminating RF carrier.

These figures show how the backscattering technique disclosed herein can be used to generate a GFSK-like signal with maximum frequency deviation 250 kHz and data symbol rate 1 MHz, such as a BLE signal. As in the previous example, the backscattering device comprises 8 loads imparting phase shifts of $$\left\{0, \frac{2\pi}{8}, \frac{2 \cdot 2\pi}{8}, \ldots, \frac{7 \cdot 2\pi}{8}\right\}$$

radians to the received RF signal, and the switching rate is 8 MHz. Moreover, a frequency offset of 2 MHz is imparted to the reflected wave.

According to embodiments herein, the modulated signal may be an On-Off Keying, OOK, modulated signal. The set of impedances may comprise 4 impedances. For generation of OOK signals there are different options.

According to some embodiments herein, during on-periods of the OOK signal, the switch controller may be configured to switch the state of the switch based on the generated modulating values such that the antenna is connected to selected impedances. Except the set of impedances used during on-periods, the wireless communication node 230, 330, 500 may further comprise an additional impedance, i.e. a fifth impedance, and during off-periods of the OOK signal, the switch may be connected to the extra impedance, i.e. the fifth impedance. The extra impedance should absorb the incoming RF-carrier. Often a 50Ω system impedance is used, and to absorb the RF-carrier the impedance should then be near 50Ω. The benefit of this option is that there will be no signal backscattered during off periods. A five-throw switch would be needed, however, and the additional impedance.

According to some embodiments herein, in order not to use any additional impedance, and to keep the four-throw switch, during off-periods the switch may be set in a fixed position by connecting to one of the set of the impedances such that a signal with a center frequency equal to the center frequency of the received illuminating RF signal is generated and transmitted. Whereas in on-periods the switch will be switched or rotated among the set of impedance as described previously. The backscattered signal will then be frequency shifted compared to the RF-carrier during on-periods, but during off-periods a signal with frequency equal to the RF-carrier will be backscattered. With a receiver tuned to the frequency shifted carrier, an OOK signal will be observed.

According to some embodiments herein, during off-periods of the OOK signal, the switch controller 550 is configured to switch the state of the switch based on the generated modulating values in an opposite order compared to during the on-periods such that a second OOK signal with a negative frequency offset with respect to the center frequency of the received illuminating RF signal is generated and transmitted. In this option the switch is rotated in the opposite direction during off-periods compared to in the on-periods. The backscattered wave will then be at the negative offset frequency from the RF carrier frequency compared to the one during the on-periods. A waveform with the opposite or inverse OOK modulation will then occur at the negative offset frequency, i.e. at the opposite spectral image. By detecting both images in a receiver, all RF-carrier energy is used for effective backscatter communication, avoiding the problem of OOK that the energy is wasted during off-periods.

To summarize, embodiments herein provide an improved method for generating and transmitting a modulated RF signal by means of backscattering. By generating a modulated RF signal with only one spectral image, the reflected power is increased by 3 dB when compared to prior art. Moreover, the modulating values can be generated and stored in a look-up table and the switch state can be set by reading from the look-up table, these require very little computation and can be implemented very efficiently in low cost backscattering devices. With the switching rate set to an integer multiple of the data symbol rate and the integer is greater than 1, the frequency offset becomes an integer multiple of the data symbol rate. This makes the look-up table based implementation very simple.

When generating OOK signals, the carrier energy is not back-scattered during the off periods of the modulation. By then backscattering the RF-carrier at the other spectral image, the energy is not wasted. The OOK signal at the other spectral image will then carry the opposite or inverse modulation, and by detecting both spectral images in a receiver, all incoming RF-carrier energy is used for backscattering information. The frequency offset from the carrier of the two spectral images can be controlled independently of the data-rate.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Therefore, the above embodiments should not be taken as limiting the scope of the invention, which is defined by the appended claims.

The invention claimed is:

1. A wireless communication node for generating and transmitting a modulated radio frequency (RF) signal by means of backscattering in a wireless communication system, the wireless communication node comprising:
   an antenna configured to receive an illuminating RF signal;
   a switch that has M states;
   a set of impedances comprising M impedances, and wherein the antenna is coupled to the set of impedances by the switch;
   a modulating value generator configured to generate modulating values based on data to be transmitted and a frequency offset; and
   a switch controller configured to switch the state of the switch based on the generated modulating values such that the antenna is connected to a selected impedance among the M impedances, and thereby the received illuminating RF signal at the antenna is modulated by the generated modulating values and reflected by the antenna to generate and transmit the modulated RF signal, wherein the switching rate is an integer multiple of the data rate, the integer is greater than 1 and the center frequency of the modulated RF signal has the frequency offset with respect to the center frequency of the RF signal.

2. The wireless communication node of claim 1, wherein the frequency offset is dependent on the duration of the data symbol to be transmitted.

3. The wireless communication node of claim 2, wherein the frequency offset is an integer multiple of the reciprocal of the data symbol duration.

4. The wireless communication node of claim 1, wherein the modulating value generator is configured to quantize the modulating values calculated based on the data to be transmitted, modulation index, phase pulse with memory and frequency offset Δf, and store the modulating values in a look-up table.

5. The wireless communication node of claim 4, wherein the switch controller is configured to control the state of the switch by reading the modulating values from the look-up table.

6. The wireless communication node of claim 1, wherein the modulating values are phase modulating values.

7. The wireless communication node of claim 1, wherein the modulated RF signal is an On-Off Keying, (OOK) modulated signal, and during on-periods of the OOK signal, the switch controller is configured to switch the state of the switch based on the generated modulating values such that the antenna is connected to selected impedances among the set of impedances.

8. The wireless communication node of claim 7, further comprising an additional impedance, and wherein during off-periods of the OOK signal, the switch connects the antenna to the additional impedance.

9. The wireless communication node of claim 7, wherein during off-periods of the OOK signal, the switch is set at a fixed position by connecting the antenna to one of the impedances in the set of impedances such that a signal with a center frequency equal to the center of frequency of the received illuminating RF signal is generated and transmitted.

10. The wireless communication node of claim 7, wherein during off-periods of the OOK signal, the switch controller is configured to switch the state of the switch based on the generated modulating values in an opposite order compared to during the on-periods such that a second OOK signal with a negative frequency offset with respect to the center frequency of the received illuminating RF signal is generated and transmitted.

11. The wireless communication node of claim 1, wherein the modulated RF signal is a Frequency Shift Keying (FSK) modulated signal.

12. The wireless communication node of claim 11, wherein the FSK is a Gaussian FSK modulated signal.

13. The wireless communication node of claim 1 comprising any one of a semi-passive or passive internet of things device.

14. A method for generating and transmitting a modulated radio frequency (RF) signal by means of backscattering in a wireless communication node in a wireless communication network, wherein the wireless communication node comprises an antenna, a switch, a set of impedances, a modulating value generator and switch controller, the method comprising:

receiving an illuminating RF signal by the antenna;

generating modulating values based on data to be transmitted and a frequency offset by the modulating value generator;

modulating the received illuminating RF signal by switching the state of the switch by the switch controller based on the generated modulating values such that the antenna is connected to a selected impedance among the set of impedances, wherein the switching rate is an integer multiple of the data rate, the integer is greater than 1 and the center frequency of the modulated RF signal has the frequency offset with respect to the center frequency of the received illuminating RF signal; and transmitting the modulated RF signal by reflecting the modulated RF signal at the antenna.

* * * * *